United States Patent [19]

Wollermann et al.

[11] 4,239,783

[45] Dec. 16, 1980

[54] REDUCTION OF MIXING TIME OF YEAST LEAVENED DOUGH COMPOSITIONS

[75] Inventors: Louis A. Wollermann, Olathe, Kans.; Dugan A. Rucker, Kansas City, Mo.; Jack K. Krum, Leawood, Kans.

[73] Assignee: International Telephone and Telegraph Corporation, New York, N.Y.

[21] Appl. No.: 852,834

[22] Filed: Nov. 18, 1977

Related U.S. Application Data

[63] Continuation of Ser. No. 687,048, May 17, 1976, abandoned.

[51] Int. Cl.³ .............................................. A21D 2/14
[52] U.S. Cl. ......................................... 426/25; 426/9
[58] Field of Search ................... 426/24, 25, 8, 9, 653, 426/331, 335, 532

[56] References Cited

U.S. PATENT DOCUMENTS

| 2,997,394 | 8/1961 | Melnick et al.a | 426/9 |
| 3,065,080 | 11/1962 | Melnick et al. | 426/9 |
| 3,556,798 | 1/1971 | Tucker et al. | 426/551 X |

OTHER PUBLICATIONS

Chemicals Used in Food Processing, Publication 1274, 1965, National Academy of Sciences—National Research Council, Washington, D. C. p. 5.

*Primary Examiner*—Joseph M. Golian
*Attorney, Agent, or Firm*—James B. Raden; Harold J. Holt

[57] ABSTRACT

The mixing time required to develop yeast leavened dough compositions is reduced by incorporating in the dough composition prior to mixing from 0.001 to 0.015 parts by weight of sorbic acid or a sodium, potassium or calcium salt of sorbic acid, for each 100 parts by weight of flour. The reduced mixing time is achieved without adverse effect on the quality of the baked product and without significant reduction in tolerance to overmixing by the dough composition.

4 Claims, No Drawings

REDUCTION OF MIXING TIME OF YEAST LEAVENED DOUGH COMPOSITIONS

This application is a continuation of Application Ser. No. 687,048, filed May 17, 1976, now abandoned.

This invention relates to a process for the reduction of the mixing time of yeast leavened dough compositions.

It has long been a goal of the baking industry to reduce the work input or mixing time required to properly mix doughs. Biological, chemical and mechanical methods have all been employed to accomplish this objective. Very often, the baker's schedule is primarily dependent upon mixing time, since this determines the number of doughs he can prepare with the equipment available to him.

The most widely accepted theory of mix time reduction is that it involves the breaking of sulfur-sulfur cross bonds between adjacent wheat protein molecules, resulting in the formation of sulfhydryl groups. Compounds that can readily form sulfhydryl groups catalyze this reaction by promoting the formation of sulfhydryl groups where disulfide bonds previously existed. Among such compounds which are today commercially used are cysteine, glutathione and various sulfites and bisulfite compounds. The compounds are characterized by their ability to effect rapid arrival time in a farinograph curve, that is, a rapid mixing time. On the other hand, these compounds also impart a very rapid breakdown to the dough compositions as evidenced by a sharp drop in the Farinograph curve, indicating poor stability.

Other compounds are known to reduce mixing time very sharply, but are not approved as food additives, such as N-ethyl maleimide, thioctic acid and dithiothreitol.

An additional class of compounds known to be capable of reducing mix time are several alpha-beta diene polyunsaturated compounds having conjugated double bonds, including fumaric acid, cinnamic acid, cinnamic aldehyde, ethyl cinnamate, 1,5-diphenyl-3-pentadiene and ascorbic acid. These compounds do not exhibit as rapid a mix time as, for example, the sulfite-type compounds but they do exhibit slightly greater stability. The use of these and other compounds for this purpose is shown in U.S. Pat. Nos. 3,304,183; 3,551,804 and 3,556,805.

In addition, U.S. Pat. No. 3,556,798 discloses the addition of sorbic acid or its salts to chemically leavened dough for its mix reduction and dough handling effects. Sorbic acid has not been suggested for use in yeast leavened dough, except as a preservative in encapsulated or chemically combined form, because of its yeast inhibiting effect. More recently, U.S. Pat. No. 3,934,045 discloses that the use of sorbic acid in certain particle sizes acts as a bread preservative in yeast leavened doughs when used in amounts of 0.1% or more of the flour weight. The coarse crystalline particle sizes disclosed are stated to avoid the yeast inhibiting effect.

It is a primary object of this invention to provide an economical process for the reduction of the mixing time of yeast leavened dough compositions prepared by the conventional mixing processes.

It is a further object of this invention to provide a process for the reduction of mixing time of yeast leavened dough compositions without sacrifice of the quality of the baked product and without significant reduction in the sensitivity or stability of the dough composition.

It is a further object of this invention to provide a process for the improvement of doughs prepared by the flour or no-flour brew processes.

It has been found that the addition of small but critical proportions of sorbic acid and its salts significantly reduces the mixing time of yeast leavened dough compositions without adverse effect on product quality. In many instances, the quality of the baked product is improved. The process of the invention involves the addition of from 0.001 to 0.015 parts by weight of sorbic acid or its sodium, potassium or calcium salts to a dough composition comprising 100 parts by weight of flour, from about 50 to 70 parts by weight of water, and yeast leavening, and developing said dough by mixing for a time significantly less than that required without the sorbic acid compound.

The present invention is applicable to conventional mixing processes for preparing flour based baked products. It does not achieve mix time reduction for doughs produced by the continuous process. Conventional mixing processes generally involve either the "straight dough" or "sponge and dough" methods. The former is a single step process in which all of the ingredients are mixed together in a single batch. A fermentation time of about 2 to 4, or in some cases 5 hours, including time required for final proofing, is ordinarily used. The sponge and dough process uses two distinct steps, the sponge stage and the dough stage. The sponge stage involves mixing part of the dough ingredients and allowing preliminary fermentation. The sponge usually comprises 50% to 75% of the total flour, all of the yeast and yeast nutrients, sufficient water for a moderately stiff dough and dough conditioners, where used. Salt and mold inhibitor are omitted from the sponge because they inhibit fermentation. Fermentation time for the sponge is from 3 to 5 hours. In the dough stage, the fermented sponge is returned to the mixer and additional ingredients are added. These usually include the remaining flour and water, milk solids, salt, mold inhibitor, sugar and shortening. Fermentation time from this point on is twenty minutes to 2 hours. The sponge method is today the most widely used method of making bread in this country. A more recent modification of the sponge method, generally referred to as the brew method, involves preparing a brew or liquid pre-ferment containing the yeast, yeast nutrient, sugar and water with or without flour, instead of a sponge, and incorporating a portion of this along with the remaining flour and other ingredients at the "dough" mixing stage of the sponge/dough process. Mix time reduction and dough conditioning problems arise particularly with the no-flour-brew process since none of the flour has been previously exposed to the conditioning action of the yeast fermentation. The foregoing processes, referred to herein as the conventional mixing processes, are described at various places in the literature, as for example, in *Baking Science and Technology*, Vol. II, Chapter 14, Edited by E. J. Pyler (1973). The same volume of the *Baking Science* text also describes the continuous mixing process at Chapter 17. The foregoing chapters of the *Baking Science* text are herein incorporated by reference.

The invention has achieved mix time reductions as high as 50% for mixing sponges and doughs to optimum development and, in spite of the low levels of addition, consistently results in mix time reductions of from 14 to over 30%. The resulting doughs and baked products have a quality at least equivalent to, and in most instances superior to the corresponding product without sorbic acid or its salts. At the very low levels used, it produces in many cases doughs which are softer and more relaxed. White pan breads containing the present additives have greater specific volume and softness. The additives were also found to extend the floor time tolerance for muffins, muffin breads and short time dough products. The foregoing results have been achieved at levels of sorbic acid addition well below the level which has any measurable inhibiting effect on yeast growth and thus the results are achieved without the prior necessity of encapsulating, chemically combining or otherwise modifying the sorbic acid compounds.

The following examples are illustrative of the practice of the invention. Unless otherwise indicated, all parts and percentages are by weight. The sorbic acid used in these examples was a standard grade of commercially available sorbic acid. The particles of this standard commercially available product ranged from 325 to 60 U.S. Standard screen size (43 to 249 microns) with the bulk of the particles (over 75%) ranging from 140 to 60 mesh size (104 to 249 microns). Our tests have indicated that amounts of this sorbic acid over about 0.05% based on flour weight have a noticeable effect on time required to proof to height, which is evidence of yeast inhibition at these levels of sorbic acid.

EXAMPLE 1

A brew bread was made by the conventional mixing process both with and without sorbic acid. The ingredients were as follows:

| | Brew | |
|---|---|---|
| Ingredient | Parts by Weight | % Flour* Basis |
| Flour | 0 | |
| Water | 307.00 | 31.98 |
| Liquid Dextrose (71% S.S.) | 34.00 | 3.54 |
| Yeast | 26.25 | 2.73 |
| Salt | 7.375 | 0.77 |
| Buffered Yeast Food | 2.125 | 0.22 |

*All percentages are based upon % contributed to the total bread formula (brew plus dough).

This brew was prepared at 78° F. and allowed to ferment for 1½ hours at which time the temperature was 88° F.

| | Dough | |
|---|---|---|
| Ingredient | Parts by Weight | % Flour Basis |
| Flour | 960 | 100.00 |
| Brew (See above) | 366 | 35.125 |
| Water | 255 | 26.56 |
| Liquid Dextrose | 91 | 9.48 |
| Lard | 26.875 | 2.80 |
| Milk Replacer | 14.4375 | 1.50 |
| Soy Flour | 11.4056 | |
| Dried Whey | 2.5265 | |
| Calcium Sulfate | 0.5054 | |
| Salt | 13.75 | 1.43 |
| Yeast Food | 7.35 | 0.77 |
| Hydrated Mono and Diglycerides | 7.1875 | 0.75 |
| Sodium Stearoyl Lactylate | 4.75 | 0.50 |
| Calcium Sulfate | 2.25 | 0.23 |
| ADA (Azodicarbon- | 0.009 | 0.0009 |

| | Dough | |
|---|---|---|
| Ingredient | Parts by Weight | % Flour Basis |
| amide | | |
| Fungal Protease Enzyme | 0.0083 | 0.0008 |
| Calcium Propionate | 0.125 | 0.013 |
| Potassium Bromate | 0.018 | 0.0019 |
| Sorbic Acid | 0.024 | 0.0025 |
| | | (zero for control) |

The dough was prepared by adding all the ingredients into a conventional, horizontal type mixer and mixing the required length of time. The addition of sorbic acid reduced the mixing time from 11 minutes for the control to 9 minutes for the sample with sorbic acid, a reduction of 18%. Each dough was then pumped by means of a "C-P" (a positive-rotary pump) through a "Stickelber" (trademark) horizontal mixer (a horizontal cylinder with a central rotating shaft having numerous impeller blades attached). The r.p.m. of this shaft was 150 for the control and 130 for the sample with sorbic acid. A 45 minute rest period followed mixing (known as "floor time"). Both of these doughs were made up, panned, proofed and baked in the conventional manner. The bread made from the dough containing sorbic acid was judged equal to, or superior to, the control in quality.

EXAMPLE 2

A brew bread was prepared from the following formulation:

| | Brew | |
|---|---|---|
| Ingredient | Parts by Weight | % Flour Basis |
| Water | 168.00 | 19.76 |
| Sugar | 17.00 | 2.00 |
| Yeast | 12.00 | 1.41 |
| Salt | 3.875 | 0.46 |
| Buffered Yeast Food | 1.125 | 0.13 |

This brew was prepared at 80° F., allowed to ferment for 2½ hours, at which time the temperature was 88° F. It was then cooled to 40° F. until needed in order to retard additional fermentation.

| | Dough | |
|---|---|---|
| Ingredient | Parts by Weight | % Flour Basis |
| Flour | 850.00 | 100.00 |
| Water | 393.00 | 46.24 |
| Brew | 204.00 | 24.00 |
| Sugar | 35.00 | 4.12 |
| Lard | 25.50 | 3.00 |
| Yeast | 12.00 | 1.41 |
| Yeast Food | 5.3125 | 0.625 |
| Salt | 15.00 | 1.76 |
| Enzyme Active Soy Flour/ Corn Flour Blend | 8.5 | 1.00 |
| Milk Replacer | 12.00 | 2.00 |
| Soy Flour | 13.43 | |
| Dried Whey | 2.975 | |
| Calcium Sulfate | 0.595 | |
| Monoglyceride/Ethoxylated Monoglyceride Blend | 2.125 | 0.25 |
| Fungal Protease Enzyme | 0.028 | 0.0033 |
| Hydrated Monoglyceride | 12.75 | 1.50 |
| Calcium Sulfate | 1.75 | 0.21 |
| Sorbic Acid | 0.02125 | 0.0025 |

-continued

| Ingredient | Dough Parts by Weight | | % Flour Basis |
| --- | --- | --- | --- |
| Monocalcium Phosphate | 2.50 | (Sample Only) | 0.295 |

The dough was prepared by adding all the ingredients into a conventional horizontal mixer and mixing the required length of time. Mix time was 14 minutes for the control, 12 minutes for the sample with sorbic acid, a reduction of about 15%. Each dough was then pumped through a "C-P" pump to a divider and made-up, proofed and baked in the conventional manner. A floor-time of 30 minutes was allowed prior to pumping. The bread was evaluated after two days and both samples were judged to be of equal quality (control and sample).

EXAMPLE 3

A bread was prepared from the following formulation:

| Ingredient | Brew Parts by Weight | % Flour Basis |
| --- | --- | --- |
| Water | 1756.00 | 14.00 |
| Yeast | 400.00 | 3.20 |
| Sugar | 218.00 | 1.75 |
| Salt | 25.00 | 0.20 |
| Buffered Yeast Food | 17.50 | 0.15 |

This brew was prepared at 90° F. and allowed to ferment for 1½ hours without agitation. It was then cooled to 45°–50° F.

| Ingredient | Dough Parts by Weight | | % Flour Basis |
| --- | --- | --- | --- |
| Flour | 650.00 | | 100.00 |
| Water | 338.00 | | 52.00 |
| Brew | 126.00 | | 19.38 |
| Liquid Dextrose | 65.00 | | 10.00 |
| Shortening | 21.00 | | 3.23 |
| Whey/Cysteine Mix | 13.00 | (control only) | 2.00 |
| Salt | 10.00 | | 1.54 |
| Bread Crumbs | 10.00 | | 1.54 |
| Softener (Monoglycerides) | 4.00 | | 0.62 |
| Yeast Food | 3.50 | | 0.54 |
| Sodium Stearoyl Lactylate | 3.00 | | 0.46 |
| Calcium Propionate | 2.00 | | 0.31 |
| Milk Replacer | 10.50 | (Sample only) | 1.62 |
| Soy Flour | 3.15 | | |
| Whey | 5.25 | | |
| Corn Flour | 2.10 | | |
| Sorbic Acid | 0.01625 | (Sample only) | 0.0025 |

In these doughs the control contained a whey/cysteine mix (sold under the trademark CM-28), a known mix reduction agent utilizing cysteine hydrochloride. The sample contained milk replacer and sorbic acid in place of the whey/cysteine mix of the control. The control dough was mixed 14½ minutes, the sample dough with whey and sorbic acid was mixed 13 minutes. Mixing and subsequent processing was done by conventional methods. The bread made with sorbic acid was judged to be superior in quality to that made with the whey/cysteine hydrochloride.

A series of additional tests were conducted on baked products prepared by conventional mixing processes both with and without the addition of sorbic acid. The tests were conducted on white bread, bun and french doughs containing 0.0025, 0.003 and 0.004 parts by weight of sorbic acid per 100 parts by weight of flour. The percent mix time reduction with sorbic acid varied from 14 to 32%. In each case, bread of equivalent or superior quality was produced from the sample containing sorbic acid.

Farinograph studies were made of a number of known mix reduction agents including alpha-beta diene compounds. The studies included comparisons of the foregoing and other compounds with a control and with the present mix reduction agents. The Brabender Farinograph is used by the baking industry to predict the mixing requirement for the production of bread utilizing a wheat flour. Certain measurements on a sample of the flour and water mixture correlate well with the actual mixing requirements in the production of bread. Any additive which is used with the flour and water mixture which lowers the mixing requirement as tested by the Brabender Farinograph will also lower the mixing requirements in conventional bread production. Among the more important factors measured are the mixing time required to reach maximum resistance (peak time) and the Brabender Units (BU) required from peak time to five minutes after peak time (MTI or Mixing Tolerance Index). Shorter peak times are an indication of reduced mixing time. Lower MTI scores are an indication of greater tolerance to overmixing. Sorbic acid and its salts were shown by these tests to combine significant mix reduction with only moderate reduction of tolerance to overmixing. The results are shown in the following examples.

EXAMPLE 4

Samples of flour and water both without and with various additives, including alpha-beta diene compounds, were prepared for Farinograph studies. The procedures used were Method No. 54-21 Cereal Laboratory Methods, 7th Edition, American Associ n of Cereal Chemists, St. Paul, Minn. The flour used in each was bread flour. 150 parts per million of additive were used per 100 parts of flour, or 0.015% of flour weight. Where ranges are given, they are the results of more than a single test. The results of these tests are set forth in Table I.

TABLE I

| Sample | Additive | Peak Time (Minutes) | MTI (Brabender Units) |
| --- | --- | --- | --- |
| 1. (Control) | NONE | 9 | 40–50 |
| 2. | Trans-Cinnamic Aldehyde | 9 | 30 |
| 3. | Ethyl Cinnamate | 11 | 25 |
| 4. | n-Caproic Acid | 10 | 15 |
| 5. | 1,5-Diphenyl-3-Pentadienone | 8½ | 30 |
| 6. | Trans-Cinnamic Acid | 7 | 60 |
| 7. | Fumaric Acid | 7½–8 | 40–60 |
| 8. | Trans-4-Phenyl-3-Buten-2-one | 10 | 30 |
| 9. | Benzoic Acid | 9 | 40 |
| 10. | Sorbic Acid | 6–6½ | 70–75 |

TABLE I-continued

| Sample | Additive | Peak Time (Minutes) | MTI (Brabender Units) |
|---|---|---|---|
| 11. | Potassium Sorbate | 6 | 70 |

Table I shows that sorbic acid produced a substantial reduction in peak time with only a moderate increase in mixing tolerance index. Fumaric acid requires large amounts to reduce mixing time—about twice that of sorbic acid to achieve equivalent mix time reduction.

We claim:

1. In a process for the preparation of a yeast leavened dough composition by the straight dough and sponge and dough mixing processes wherein the dough is developed by mixing together 100 parts by weight of flour, from 50 to 70 parts by weight of water, and yeast leavening, the improvement comprising reducing the mixing time required to develop said dough incorporating in said composition from 0.001 to 0.015 parts by weight of an additive selected from the group consisting of sorbic acid and the sodium, potassium and calcium salts of sorbic acid and mixing said composition to develop said dough for a time substantially less than the time required to develop said dough without the additive.

2. The process of claim 1, in which the additive is sorbic acid.

3. The process of claim 1, in which the additive is potassium sorbate.

4. The process of claim 1, in which the dough composition is bread.

* * * * *